July 11, 1950 H. M. FORTIER 2,514,945
NUT AND FRUIT PICK-UP DEVICE
Filed Nov. 23, 1948 2 Sheets-Sheet 1
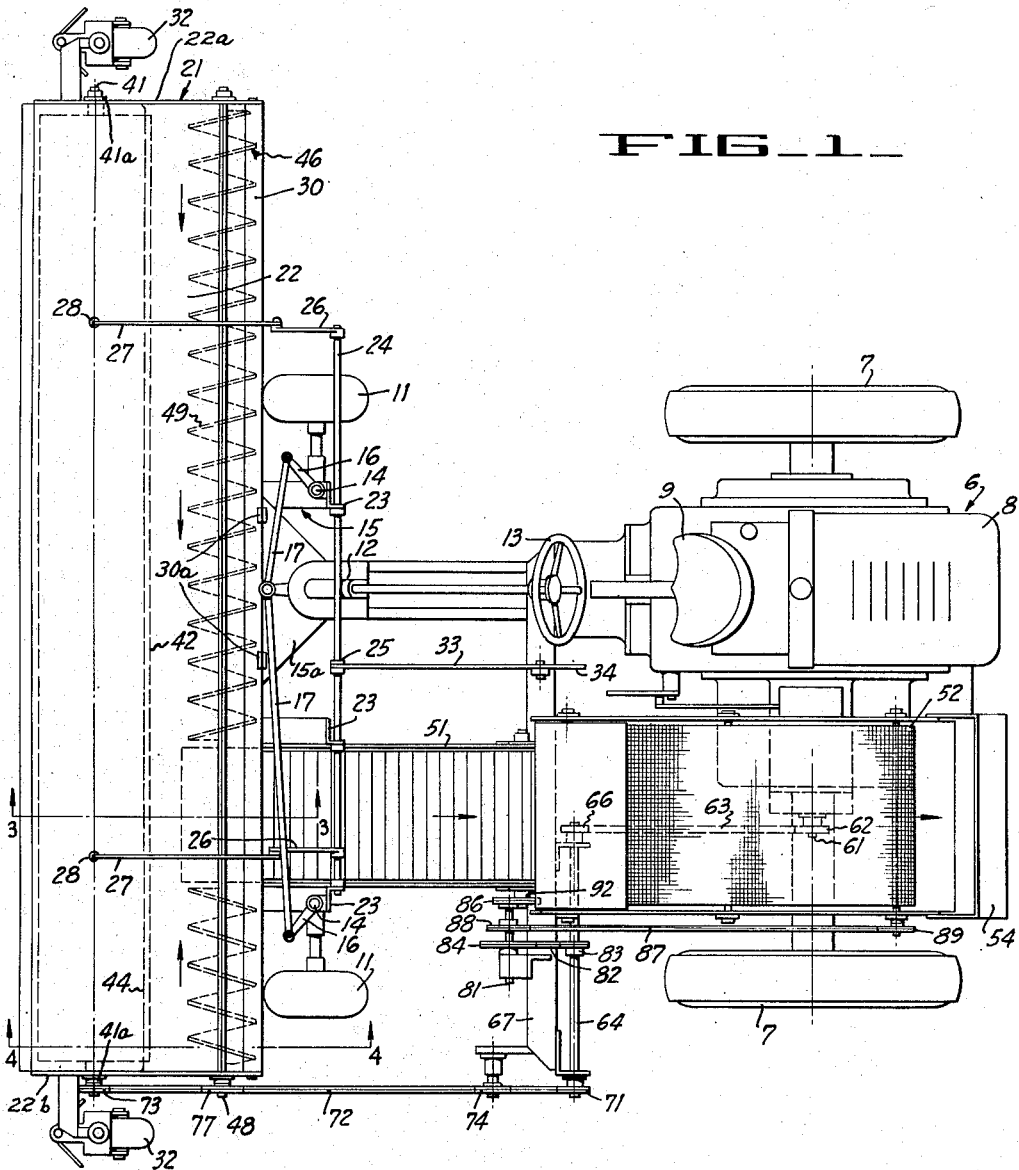
FIG_1_
INVENTOR.
Herman M. Fortier
BY
ATTORNEY July 11, 1950  H. M. FORTIER  2,514,945
NUT AND FRUIT PICK-UP DEVICE
Filed Nov. 23, 1948  2 Sheets-Sheet 2
FIG_2_
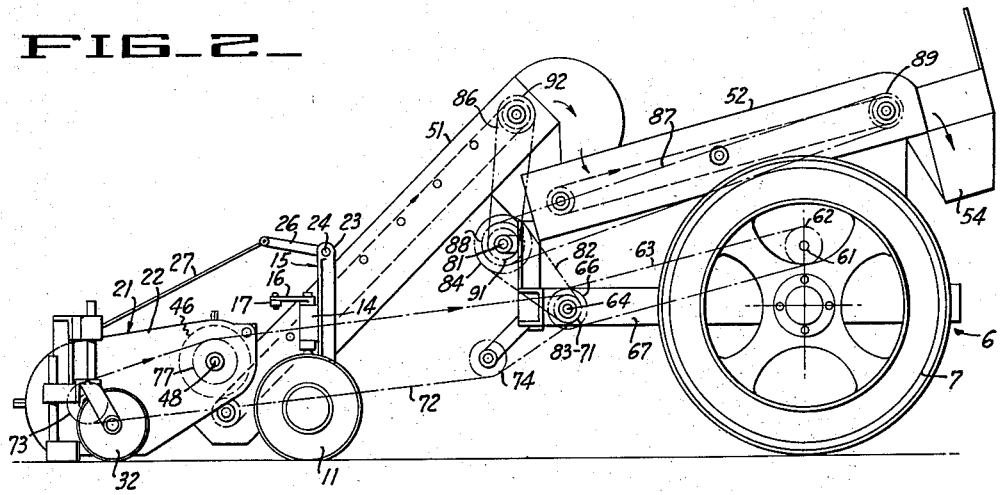
FIG_3_
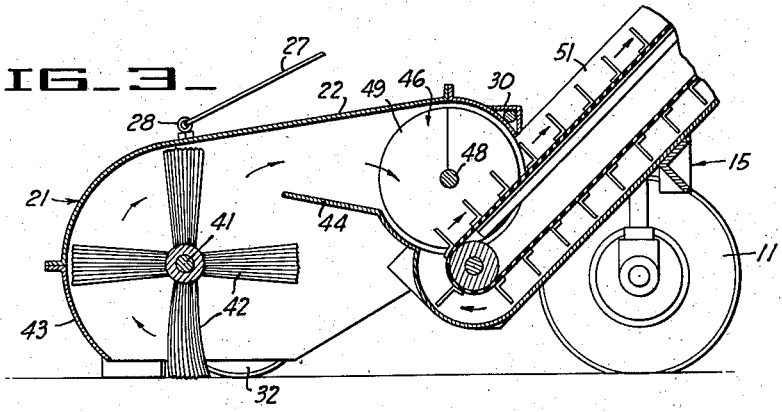
FIG_4_
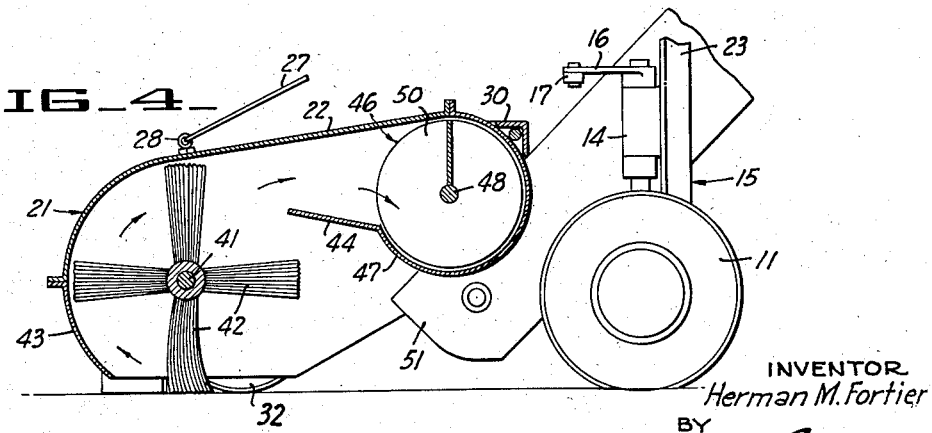
INVENTOR.
Herman M. Fortier
BY
ATTORNEY Patented July 11, 1950

2,514,945

UNITED STATES PATENT OFFICE 2,514,945

NUT AND FRUIT PICKUP DEVICE

Herman M. Fortier, near Chico, Butte County, Calif.

Application November 23, 1948, Serial No. 61,580

1 Claim. (Cl. 56—328)

This invention relates to a device for picking up almonds, walnuts, prunes, and the like from the ground. The invention will be particularly described as it has been practiced upon almonds, but the device is obviously suited to picking up other nuts and fruits.

It is in general a broad object of the present invention to provide a novel nut and fruit pick-up device.

Another object of the present invention is to provide a pick-up device which can be moved rapidly over the ground to pick up nuts and fruit.

The invention includes other objects and features of invention, some of which, together with the foregoing, will appear hereinafter, wherein the present preferred form of pick-up device is disclosed.

In the drawings accompanying and forming a part hereof,

Figure 1 is a plan view of a dirigible vehicle having mounted thereupon a pick-up mechanism embodying the present invention.

Figure 2 is a side elevation of the vehicle and pick-up device shown in Figure 1.

Figures 3 and 4 are sections taken respectively upon the lines 3—3 and 4—4 in Figure 1.

Referring particularly to the drawings, numeral 6 designates generally a dirigible vehicle; that shown includes rear traction wheels 7 which are suitably driven from a motor 8 under the control of an operator seated upon seat 9. The vehicle includes wheels 11 at its forward end which are moved by steering mechanism 12 and steering wheel 13 to alter the path of the vehicles as it moves over the ground; the wheels are hinged as at 14 on a forward frame portion 15 of the vehicle. A pitman arm 16 is secured to each hinge wheel mounting and is connected by rods 17 to the steering mechanism 12. The dirigible vehicle disclosed is one typically available; it will be appreciated that any other suitable dirigible vehicle can be used instead.

Mounted forwardly of the vehicle and adapted to move over the ground in advance of the vehicle is the pick-up and gathering mechanism generally indicated by numeral 21 and including an arcuate housing structure 22, the whole being mounted on a suitable frame, as will be described. The pick-up mechanism is adjustably mounted on the front of the vehicle so that it can be lowered into operating position or raised from that position to permit the vehicle to move freely over the ground. To this end, uprights 23 are mounted upon the forward frame portion 15 of the vehicle to provide a support for a transverse shaft 24.

Levers 26 are provided upon the shaft and rods 27 are extended forwardly therefrom to ears 28 mounted on housing 22. Shaft 24 is selectively rotated by the operator as by a lever 25 secured to the shaft 24 and by a rod 33 to the control lever 34. An angle iron 30 is extended along the length of the housing 22 and suitable hinge mountings 30a are provided between this and the transversely extending plate like portion 15a of the forward frame portion 15. By moving lever 34 rearwardly the entire pick-up can be lifted clear of the ground, while forward movement of the lever permits the pick-up to move into pick-up position in which it is supported in a desired position of adjustment with respect to the ground by caster wheels 32.

The pick-up mechanism comprises a horizontal shaft 41 mounted in bearings 41a in the side walls 22a and 22b of the housing structure 22. The shaft 41 has a plurality of separate brushes 42 extending radially therefrom at spaced intervals about the shaft. In Figures 3 and 4 in the drawing, I have indicated four spaced brushes positioned radially at equal intervals about the shaft, but more or less can be used as desired. It is important, however, that the brushes not be continuous and that they be spaced apart because it is necessary that the brushes cooperate with arcuate housing 22 and particularly the forward arcuate wall surface 43 thereof. Thus, referring particularly to Figures 3 and 4, it is to be pointed out that the forward wall surface 43 of arcuate housing 22 extends nearly to ground level and closely adjacent to the rotational path of the several brushes 42. It is also important that the brushes be rotated in the direction of advance of the vehicle. Thus, in Figures 3 and 4, the vehicle is adapted to move horizontally from right to left. Similarly, the brushes are adapted to rotate in a clockwise direction so the brushes sweep forward in the direction of advance of the vehicle over the ground, thus sweeping nuts and other objects upwardly into the space confined between the brushes and the arcuate wall surface 43, the brushes being of a length whereby they sweep the ground and move the objects on the ground forward to lift them into the free space between the radial brush and the housing. If the brush is continuous, that is, if the entire periphery of shaft 41 is covered with brush bristles which sweep the ground, these merely serve to impale the soft outer covering provided upon an almond or walnut, or the soft surface of a fruit such as a prune or apricot, and to retain the impaled object on the ends of the bristles making up the brush. By providing brushes at spaced intervals about the shaft and by moving these forwardly, in cooperation with the arcuate housing, the objects can be moved off the ground and into the space between the housing and the brush. The speed of rotation of the brush shaft and the peripherical speed of the brushes is not critical so long as the brushes move with a rapidity sufficient to move the nuts forward and to between the brush and the housing. I have used shaft speeds of from 500 R. P. M. to 1400 R. P. M. with brushes having a radial length of 12 inches.

As the brush completes its rotation, the objects are thrown off by centrifugal force and are received upon a shelf 44 which extends generally horizontally, preferably at an elevation above that of the shaft 41. The shelf 44 preferably tilts rearwardly slightly to deliver the objects into a suitable conveyor such as that provided by the screw conveyor generally indicated at 46 and which includes a suitable cooperating trough 47, a shaft 48 having opposite hand screws 49 and 50 mounted thereon, as appears particularly in Figure 1, and which serve to deliver the nuts to the intermediate conveyor structure 51 provided between the screws 49 and 50, as appears in Figures 1 and 3. The intermediate conveyor structure 51 moves the nuts upwardly, to discharge them into a rearwardly extending conveyor structure 52 and which serves to transport nuts to the rear of the machine and to separate the nuts from leaves and waste; separator-conveyor 52 discharges the nuts through a chute 54 into a wheeled trailer or other suitable collecting means drawn by the vehicle in a loading position.

The pick-up mechanism and the several conveyors are suitably driven in a timed relation, preferably from the power take-off shaft 61 of the motor 8; shaft 61 has a sprocket 62 mounted thereon over which a chain 63 is passed and which in turn drives a jack shaft 64 by means of a sprocket 66 thereon; the jack shaft is suitably journalled upon an auxiliary extending frame member 67. Jack shaft 64 carries a sprocket 71 and a chain 72 is trained about this, about a sprocket 73 provided upon the brush shaft 41 and over a sprocket 77 on conveyor shaft 48; an idler sprocket 74 serves to guide and to maintain the desired tension in the chain. A second jack shaft 81 is driven from jack shaft 64 by a chain 82 passed about suitable sprockets 83 and 84 on each of the shafts. From the second jack shaft 81, chains 86 and 87 are extended about suitable pairs 88—89 and 91—92 to drive conveyors 51 and 52.

From the foregoing, it is believed to be apparent that I have provided a novel, simple, and yet highly effective pick-up mechanism which can be applied successfully to the gathering of objects from the ground such as almonds, walnuts, and other like articles.

I claim:

In an apparatus movable over the ground to pick up nuts and fruits thereon: a horizontal transversely extending shaft; bearings supporting said shaft for rotation; a plurality of separate angularly spaced brushes mounted longitudinally on said shaft and extending radially from the shaft; means for rotating said shaft to advance said brushes over the ground in the normal direction of movement of the apparatus over the ground; a housing for said brush including side walls in which said bearings are mounted, a substantially semi-circular forward portion and a rearward portion, said forward portion conforming closely to the path of movement of the outer ends of said brushes from adjacent the ground level to confine objects swept forwardly and upwardly from the ground by said brushes, said rearward portion extending rearwardly and upwardly from said forward portion to deflect objects discharged from between said brushes, said rearward portion terminating at its rearward end in a horizontal conveyor trough extending substantially parallel to said shaft, said trough having an open top within said housing; a shelf within said rearward portion of said housing and extending substantially parallel to said shaft and said trough, said shelf having its forward edge positioned above and to the rear of said shaft and its rearward edge positioned adjacent the open top of said trough to receive objects from said brushes and discharge such objects into said trough; a conveyor screw in said trough for conveying objects along the trough, and means for adjustably supporting said housing.

HERMAN M. FORTIER.

REFERENCES CITED

The following references are of record in the file of this patent:

UNITED STATES PATENTS

| Number | Name | Date |
|---|---|---|
| 684,051 | Farquhar | Oct. 8, 1901 |
| 1,085,676 | Finch | Feb. 3, 1914 |
| 1,173,485 | Coldwell | Feb. 29, 1916 |
| 1,509,468 | Braun | Sept. 23, 1924 |
| 2,065,169 | Carpenter | Dec. 22, 1936 |
| 2,205,249 | Fitzgerald et al. | June 18, 1940 |
| 2,448,328 | Russell | Aug. 31, 1948 |